(12) United States Patent
Chandrashekar

(10) Patent No.: US 12,212,568 B1
(45) Date of Patent: Jan. 28, 2025

(54) MANAGED ATTESTATION SERVICE FOR COMPUTE INSTANCES

(71) Applicant: Amazon Technologies, Inc., Seattle, WA (US)

(72) Inventor: Samartha Chandrashekar, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 76 days.

(21) Appl. No.: 17/337,900

(22) Filed: Jun. 3, 2021

(51) Int. Cl.
*H04L 29/06* (2006.01)
*H04L 9/40* (2022.01)

(52) U.S. Cl.
CPC .............. *H04L 63/10* (2013.01); *H04L 63/08* (2013.01); *H04L 63/20* (2013.01)

(58) Field of Classification Search
CPC ......... H04L 63/10; H04L 63/20; H04L 63/08; H04L 63/145; H04L 63/1408; H04L 63/12
USPC ............................................................ 726/4
See application file for complete search history.

(56) References Cited

U.S. PATENT DOCUMENTS

| | | | | |
|---|---|---|---|---|
| 8,011,002 B1* | 8/2011 | Upadhyay | ........... | H04L 63/0281 713/168 |
| 8,793,782 B1* | 7/2014 | Su | ........ | H04L 63/0807 713/153 |
| 9,038,138 B2* | 5/2015 | Trammel | ........... | H04L 63/0876 713/188 |
| 9,077,758 B1* | 7/2015 | McGovern | .............. | H04L 63/14 |
| 9,575,790 B2 | 2/2017 | Tosa et al. | | |
| 9,602,494 B2* | 3/2017 | Syed | ........ | H04L 67/53 |
| 9,652,631 B2 | 5/2017 | Novak et al. | | |
| 9,867,043 B2 | 1/2018 | Aissi | | |
| 10,042,354 B2* | 8/2018 | Chand | ........... | G06F 21/567 |
| 10,554,634 B2 | 2/2020 | Bowman et al. | | |
| 2018/0341768 A1 | 11/2018 | Marshall et al. | | |
| 2022/0374522 A1* | 11/2022 | Samuel | ........ | G06F 21/54 |

* cited by examiner

*Primary Examiner* — Longbit Chai
(74) *Attorney, Agent, or Firm* — Robert C. Kowert; Kowert, Hood, Munyon, Rankin & Goetzel, P.C.

(57) ABSTRACT

An attestation service is configured to receive a request to enable attestation for a compute instance according to an attestation policy indicating one or more baseline health measurement values for validating compute instances. The attestation service provides a network endpoint for the compute instance to request attestation. The attestation service receives, via the network endpoint from a compute instance, one or more health measurement values of the compute instance. The attestation service validates the compute instance based at least on a comparison of the one or more current health measurement values and the one or more baseline health measurement values. The attestation service, in response to validating the compute instance, generates an attestation token indicating that the compute instance is authorized to access a secured resource of the provider network.

20 Claims, 9 Drawing Sheets

---

800

Send, to a trusted platform module from a compute instance, a request for information indicating a current configuration for the compute instance 802

↓

Receive, at the compute instance from the trusted platform module, information indicating the current configuration for the compute instance 804

↓

Send, from the compute instance to a network endpoint of an attestation service, a data request for data stored at a secured resource, the data request including the information indicating the current configuration for the compute instance 806

↓

Receive, at the compute instance from the attestation service, the requested data 808

600

```
┌─────────────────────────────────────────────────────────────────────┐
│ Send, to a trusted platform module from a compute instance, a request for │
│ information indicating a current configuration for the compute instance 602 │
└─────────────────────────────────────────────────────────────────────┘
                                    ↓
┌─────────────────────────────────────────────────────────────────────┐
│ Receive, at the compute instance from the trusted platform module, information │
│ indicating the current configuration for the compute instance 604    │
└─────────────────────────────────────────────────────────────────────┘
                                    ↓
┌─────────────────────────────────────────────────────────────────────┐
│ Send an attestation request to a network endpoint of an attestation service, the │
│ attestation request including the information indicating the current configuration │
│ for the compute instance 606                                         │
└─────────────────────────────────────────────────────────────────────┘
                                    ↓
┌─────────────────────────────────────────────────────────────────────┐
│ Receive, at the compute instance from the attestation service, an attestation │
│ token for the compute instance 608                                   │
└─────────────────────────────────────────────────────────────────────┘
                                    ↓
┌─────────────────────────────────────────────────────────────────────┐
│ Send, from the compute instance to a secured resource, an access request for │
│ data stored at the secured resource, the access request including at least a │
│ portion of the attestation token 610                                 │
└─────────────────────────────────────────────────────────────────────┘
                                    ↓
┌─────────────────────────────────────────────────────────────────────┐
│ Receive, at the compute instance from the secured resource, the requested data │
│ 612                                                                  │
└─────────────────────────────────────────────────────────────────────┘
```

FIG. 6

MANAGED ATTESTATION SERVICE FOR COMPUTE INSTANCES

BACKGROUND

Computing servers require authentication in order to limit access to secured data that is stored on the computing servers. The servers can determine whether a requesting client, such as a compute instance, is authorized based on whether the requesting client possess an authentication token that indicates that the requesting client is authorized. The compute instance may include a trusted platform module that may be configured to authenticate the compute instance based on hardware and/or software implemented on or by the requesting client. The trusted platform module may be implemented in software or a hardware device accessible by the compute instance. The trusted platform module may be configured to perform measurements relating to a health status of the compute instance to authenticate the compute instance.

Cloud computing service providers may provide access to compute instances that provide computing resources to remote clients. The clients may implement an attestation service at the compute instance in order to authenticate the compute instance based on the measurements from the trusted platform module. However, a client-implemented attestation service may introduce security concerns as to whether compute instance is properly attesting itself to gain access to the secured data of the computing server. The attestation service may be managed by the service provider in order to improve security and consistency for authorizing compute instances. Thus, the service provider may be able to properly attest that the compute instance is authorized to access the secured resource.

BRIEF DESCRIPTION OF THE DRAWINGS

FIG. 6 is a flowchart diagram depicting a method for a compute instance requesting attestation to retrieve data from a secured resource, according to some embodiments.

Figure 1:
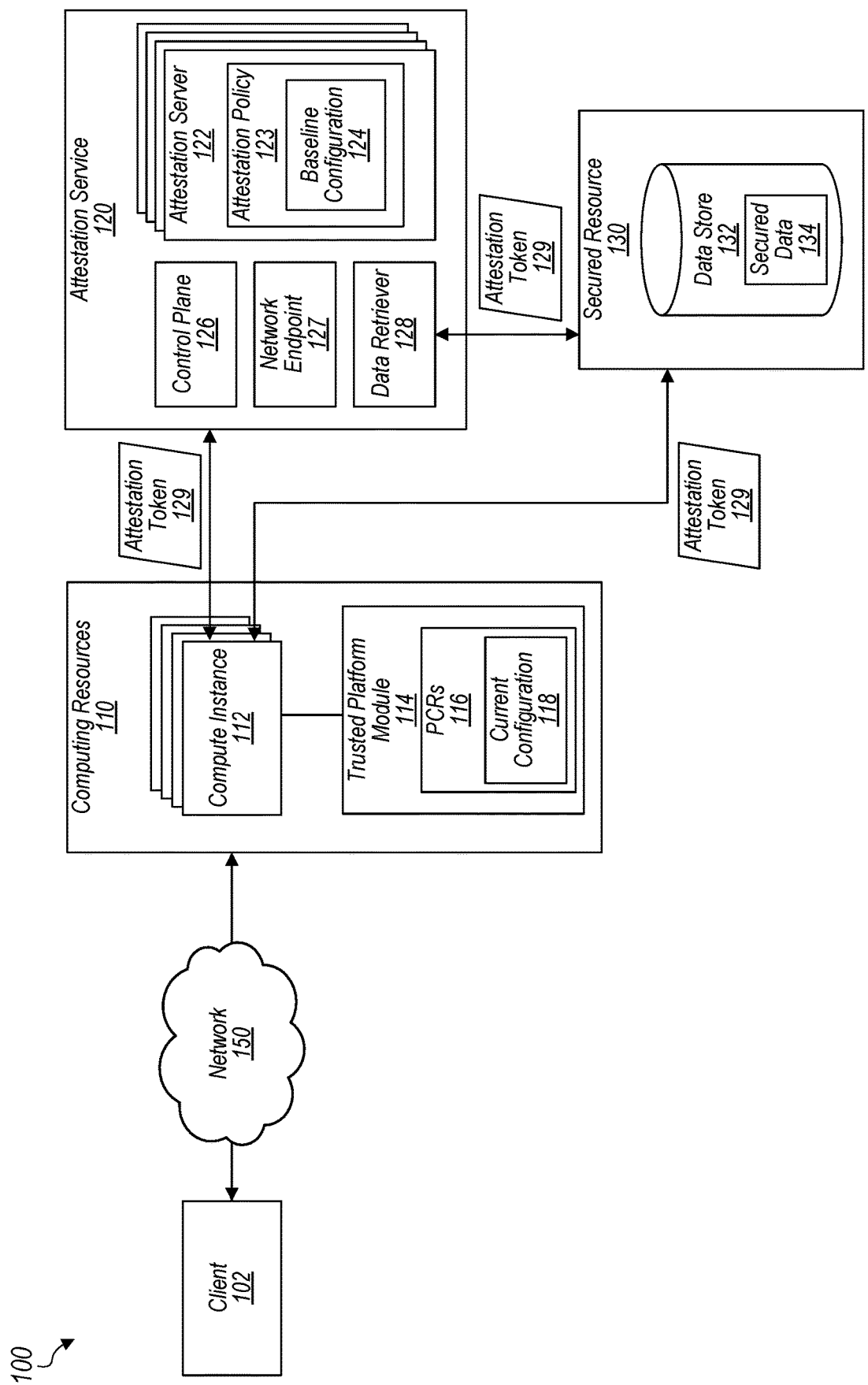
FIG. 1 is a block diagram illustrating a system that provides a managed attestation service for compute instances to access secured resources, according to some embodiments.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

DETAILED DESCRIPTION

Various embodiments of systems and processes for managing attestation of compute instances as a service is disclosed. The system may include a service provider network that includes many computing resources configured to provide compute instances for virtualized computing systems to clients that are accessible via a remote network connection. A compute instance may perform computing tasks on behalf of a client. In some instances, the compute instance may request access to secured data stored at a secured resource, such as a server located elsewhere on the provider network or at a remote server.

The compute instance may attempt a connection request to access secured data at the secured resource without prior authorization. The secured resource may respond to the attempt by rejecting the connection request and requiring that the compute instance provide an indication that the compute instance is compliant with security requirements. The indication may be in the form of an attestation token that indicates that the compute instance has satisfied the security requirements.

The compute instance may have access to a trusted platform module (TPM) configured to provide measurements that may indicate a health status of the compute instance. In some situations, the trusted platform module may include a hardware component that is installed at the computing resource that hosts the compute instance. The TPM may be configured to store the measurements in platform configuration registers (PCRs) such that respective values stored in respective PCRs may indicate different configurations or statuses of the compute instance. The compute instance may request that the TPM provide the measurements that are stored in the PCRs to the compute instance. The compute instance may then provide the measurements to a managed attestation service in order to obtain an attestation token.

The attestation service may be a managed server that is implemented by the provider network. Rather than individual compute instances managing an attestation stack within the compute instances, the managed server may be controlled by the provider network such that attestation tokens generated by the attestation service are trusted by downstream services or servers. The attestation service may establish an attestation policy for the compute instance. The attestation policy may be provided in advance by the client or another entity. The attestation policy may include baseline values for determining whether a given compute instance may be authorized to access the secured resource. The baseline values of the attestation policy may be compared against the measurements provided by the TPM. If the attestation service determines that the measurements satisfy the attestation policy, the attestation service may generate the attestation token for the compute instance.

The attestation service may provide the attestation token to the compute instance. The compute instance may initiate an access request for secured data at the secured resource in accordance with the attestation token. The access request may include the attestation token, a security key from the attestation token, or other identifiable information based on the attestation token.

In other situations, the attestation service may act as an intermediary to obtain the secured data from the secured resource in accordance with the attestation token. The compute instance may not necessarily need to directly access the secured resource in order to obtain the secured data.

The secured resource may authenticate the access request based on validating the attestation token or information included in the attestation token. The secured resource may be configured to validate the attestation token by determining which attestation service generated the attestation token or digitally signed the attestation token. The secured resource may identify the attestation service based on a digital signature or a key in the attestation token that indicates the attestation service. The secured resource may search a list of authorized attestation services to determine whether the identified attestation service is an authorized attestation service.

After validating the attestation token, the secured resource may retrieve the requested data from a data store. The secured resource may provide the requested data to the entity that requested the data.

In situations when the attestation service is the requesting entity acting as an intermediary, the attestation service may receive the requested data from the secured resource. The attestation service may then send the requested data to the compute instance without requiring that the compute instance directly access the secured resource.

As one skilled in the art will appreciate in light of this disclosure, embodiments may be capable of achieving certain technical advantages, including some or all of the following: reducing computational overhead to make a computer run more efficient, reducing memory requirements, improving information security management of computing systems, etc.

In one embodiment, a provider network is disclosed. The provider network includes a virtual computing service comprising a first plurality of computing devices configured to respectively host one or more compute instances. The provider network also includes an attestation service comprising a second plurality of computing devices. The attestation service is configured to receive a request to enable attestation for a compute instance according to an attestation policy indicating one or more baseline health measurement values for validating compute instances. The attestation service is also configured to provide a network endpoint for the compute instance to request attestation. The attestation service is also configured to receive, via the network endpoint from a compute instance, one or more health measurement values of the compute instance. The attestation service is further configured to validate the compute instance based at least on a comparison of the one or more current health measurement values and the one or more baseline health measurement values. The attestation service is also configured to in response to validating the compute instance, generate an attestation token indicating that the compute instance is authorized to access a secured resource of the provider network.

In another embodiment, a computer-implemented method is disclosed. The method may be performed by on or across one or more computing devices. The method may include receiving, at an attestation service comprising one or more computing devices, a request to enable attestation for compute instances according to an attestation policy indicating a baseline configuration for validating the compute instances. The method also includes providing, by the attestation service, a network endpoint for the compute instances to request attestation. The method further includes validating, by the attestation service, a current configuration of a compute instance received via the network endpoint based, at least in part on, a comparison of the current configuration of the compute instance with the baseline configuration in the attestation policy. The method also includes generating, by the attestation service, an attestation token indicating that a compute instance is authorized to access a secured computing resource upon providing the attestation token to the secured resource.

In yet another embodiment, one or more computer-readable storage media storing instructions are disclosed. The instructions, when executed on or across one or more processors, cause the one or more processors to perform operations. The operations include in response to receiving a request to enable attestation for compute instances according to an attestation policy indicating a baseline configuration for validating the compute instances, providing a network endpoint for the compute instances to request attestation. The operations also include validating a current configuration of a compute instance received via the network endpoint based, at least in part on, a comparison of the current configuration of the compute instance with the baseline configuration in the attestation policy. The operations further include generating an attestation token indicating that a compute instance is authorized to access a secured computing resource upon providing the attestation token to the secured resource.

FIG. 1 illustrates a block diagram of a system 100 for managed attestation of compute instances, according to some embodiments. The system 100 may include one or more computing resources 110 configured to provide computing services to a client 102 via a network 150, according to some embodiments. The computing resources 110 may be implemented as part of a service provider network 160, according to some embodiments.

The computing resources 110 may be configured to provide virtualized computing systems to the client 102, according to some embodiments. The virtualized computing systems may include one or more compute instances 112 that are implemented on or across the computing resources 110. In some embodiments, the computing resources 110 may include computing hardware that includes one or more processors and one or more memories that store instructions that, when executed on or across the one or more processors, cause the one or more processors to implement a virtualized computing system.

The compute instances 112 may be configured to perform various computing tasks on behalf of the client 102, according to some embodiments. A compute instance 112 may be allocated to the client 102 based on provisioning at least a subset of the computing resources 110 to the client 102. The client 102 may instruct the compute instance 112 to perform various tasks that may utilize various aspects of the computing resources 110 to fulfill the various tasks, according to some embodiments.

The computing resources 110 may include a trusted platform module (TPM) 114, according to some embodiments. The TPM 114 may include one or more hardware components configured to store information that indicates a health status of the compute instance 112 or the compute resources 110, according to some embodiments. For example, the TPM 114 may include one or more platform configuration registers (PCRs) 116 such that respective values stored in respective ones of the PCRs 116 may indicate different configurations or statuses of the compute instance 112. The TPM 114 may periodically or repeatedly monitor the compute instance 112 or the compute resources 110 and store a current configuration 118 into the PCRs 116. In some embodiments, the computing resources 110 may include other components or devices that implement software stacks that may replicate TPM behavior without necessarily being a TPM. For example, the computing resources 110 may implement a stack that performs the functionality of a TPM without use of a random number generator. In some embodiments, the other components may include an enclave element configured to securely record configuration information about the compute instance 112.

The compute instance 112 may attempt to send an access request to a secured resource 130 in order to access secured data 134, according to some embodiments. The secured resource 130 may initially reject the access request from the compute instance 112 if the access request does not indicate that the compute instance 112 is authorized to access the secured data 134. For example, the secured resource 130 may send a notification to the compute instance 112 indicating that the compute instance 112 must be authorized to access the secure data 132. In some embodiments, authorization of the compute instance 112 may indicate that the health status of the compute instance 112 satisfies security criteria established for the compute instance 112.

The compute instance 112 may initiate an attestation process by obtaining configuration information for the compute instance 112 from the TPM 114, according to some embodiments. For example, the compute instance 112 may send a request to the TPM 114 for a current configuration 118 of the compute instance 112 indicating current health measurement values of the compute instance 112, where the current health measurement values may be stored in the PCRs of the TPM 114. The TPM 114 may provide the current configuration 118 including the current health measurement values from the PCRs to the compute instance 112 in response to the request, according to some embodiments.

The compute instance 112 may send an attestation request, including the current configuration 118, to an attestation service 120 to validate the compute instance 112, according to some embodiments. The attestation service 120 may include or be implemented by one or more computing devices comprising one or more processors and a memory that stores instructions that, when executed on or across the one or more processors, cause the one or more processors to implement the attestation service 120, according to some embodiments. The attestation service 120 may include one or more attestation servers 122, in some implementations. The one or more attestation servers 122 may include respective attestation policies 123 that may represent different attestation policies 123 for different compute instances 112. Alternatively, the respective attestation policies 123 may represent different attestation policies 123 for different secured resources 130. For example, a first secured resource may have a first attestation policy managed by a first attestation server, while a second secured resource may have a second attestation policy managed by a second attestation policy.

The attestation service 120 may expose one or more application programmatic interfaces (APIs) to enable the client 102 or the compute instance 112 to interact with the attestation service 120, according to some embodiments. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

In other implementations, the attestation service 120 may be a part of an external attestation service that is outside of the provider network but also accessible by resources or services within the provider network 160. In some embodiments, the attestation service 120 may be included as part of the computing resources 110 as a resource that is accessible by the compute instance 112.

The attestation service 120 may be a managed service that is managed by the provider network 160, according to some embodiments. For example, the provider network may be configured to manage the attestation service 120 to allow the compute instances 112 to have access to an attestation service without requiring the compute instances 112 to deploy their own attestation services that are separate from the attestation service 120 provided by the provider network 160.

The attestation service 120 may receive a request to enable attestation for compute instances 112, according to some embodiments. For example, the attestation service 120 may include a control plane 126 configured to receive the request from the client 102 via one or more interfaces accessible by the client 102. In some embodiments, the compute instance 112 may be configured to send the request to enable attestation by the attestation service 120 for the compute instance 112. In other embodiments, the client 102 may send the request to enable attestation as part of an onboarding process with the provider network 160. In yet other embodiments, an administrator of the provider network may send the request to enable attestation to the attestation service 120. In some other embodiments, the secured resource 130 may send the request to enable attestation in order to provide a centralized resource for attestation of the compute instances 112.

The attestation service 120 may also be configured to receive attestation policies in accordance with an API established by the control plane 126, according to some embodiments. For example, the client 102 may provide a given attestation policy to be applied to the compute instance 112. Further modifications to an attestation policy may be provided via the API. In some embodiments, the attestation service 120 may include one or more attestation servers 122 that can be delegated to respective ones of the compute instances 112. For example, a first attestation server may be assigned to a first group of compute instances 112, and a second attestation server may be assigned to a second group of compute instances 112. As another example, a first attestation server may be assigned to attest compute instances on behalf of the secured resource 130, and the second attestation server may be assigned to attest compute instances on behalf of another service or resource.

The attestation service 120 may be configured to provide a network endpoint 127 for compute instances 112 to request attestation, according to some embodiments. For example, attestation service 120 may include a control plane 126 configured to provide the network endpoint 127 to the compute instance 112 in response to the request to enable attestation. The compute instance 112 may be configured to access the network endpoint 127 to request attestation and provide information to facilitate attestation, such as providing the current configuration 118. The network endpoint 127 may be accessible by the compute instance 112 such that the compute instance 112 may send attestation requests to the attestation service 120.

The attestation service 120 may receive the current configuration 118 from the compute instance 112 via a network connection, according to some embodiments. The network connection may include an intranet connection or an internet connection in different implementations. The attestation service 120 may validate the compute instance 112 based on one or more security criteria, according to some embodiments. The security criteria may include determining whether the compute instance satisfies an attestation policy 123, according to some embodiments.

The attestation policy 123 may establish minimum standards for validating compute instances 112, according to some embodiments. For example, the attestation policy 123 may include a baseline configuration 124 that may include one or more baseline values that correspond to minimum or maximum values for the health measurement values as recorded by the TPM 114 for the compute instance 112. The attestation service 120 may be configured to validate the compute instance 112 based at least in part on the current configuration 118 and the baseline configuration 124, according to some embodiments. For example, the attestation service 120 may be configured to compare respective ones of the current health measurement values to respective ones of the baseline health measurement values. The attestation service 120 may determine whether a given measurement is greater than or equal to a given baseline health measurement value that establishes a minimum value for the current health measurement value. The attestation service 120 may also determine whether a given health measurement value is less than or equal to a given baseline health measurement value that establishes a maximum value for the health measurement value.

Based on a determination that the current configuration 118 satisfies the baseline configuration 124, the attestation service 120 may determine that the compute instance 112 is validated, according to some embodiments. The attestation service 120 may be configured to generate an attestation token indicating that the attestation service 120 has validated the compute instance 112. In some embodiments, the attestation service 120 may send the attestation token to the compute instance 112. For example, the attestation service 120 may respond to the attestation request from the compute instance 112 by returning the attestation token.

In some embodiments, the attestation service 120 may store different attestation policies 123 that apply to different compute instances 112. The client 102 may provide the different attestation policies 123 during an onboarding or setup process. The different attestation policies 123 may include different baseline values with respect to other ones of the different attestation policies 123, according to some embodiments. For example, a given attestation policy may have a given baseline configuration that is different from another attestation policy with a different baseline configuration. The different sets of baseline values may represent different requirements for different types of operations, according to some embodiments. For example, one baseline configuration may represent security criteria for accessing the secured resource 130, while another baseline configuration, when satisfied, causes limitations on functions that a given computing instance may perform. In some embodiments, the limitations on functions may include ingress or egress of network traffic to or from the compute instance 112. In other embodiments, the limitations on functions may include other restrictions on how the compute instance 112 may be used. In some embodiments, the other baseline configuration may be applied to subsequent compute instances of the compute instances 112.

Based on a determination that the current configuration 118 for a given computing instance satisfies the other baseline configuration that causes limitations, the attestation service 120 may send instructions that cause the given computing instance to apply limits to the functionalities of the given computing instance, according to some embodiments. For example, the attestation service 120 may determine that the health status of the given computing instance necessitates reduced workload capabilities, in order to prevent damage to the computing resources 110. Thus, the attestation service 120 may send instructions to the given compute instance to reduce workload throughput, e.g., CPU or GPU throughput, in order to reduce strain on the computing resources 110.

The compute instance 112 may send another access request to the secured resource 130 for retrieving the secured data 134 in accordance with the attestation token 129, according to some embodiments. For example, the compute instance 112 may generate the access request by including the attestation token 129 as part of the access request. As another example, the compute instance 112 may generate the access request by including data from the attestation token 129 as part of the access request, such as a key value or signature. The access request may include information indicating a source of the attestation token 129, according to some embodiments. For example, the access request may indicate that the attestation service 120 was the source of the attestation token 129. As another example, the access request may indicate that the attestation service 120 generated the attestation token 129.

The secured resource 132 may include a data store 132 configured to store data, such as the secured data 134, according to some embodiments. The data store 132 may include one or more storage devices configured to store data on behalf of the secured resource 132. The one or more storage devices may include one or more hard disk drives or one or more solid state drives.

The secured resource 130 may be configured to authenticate the access request from the compute instance 112 based at least in part on validating the access request, according to some embodiments. For example, the secured resource 130 may be configured to validate at least a portion of the attestation token 129 that is included in the access request. The secured resource 130 may be configured to validate the access request based on determining whether a signature of the attestation token 129 indicates an authorized source of the attestation token 129, according to some embodiments. The signature of the attestation token 129 may indicate that the attestation service 120 generated the attestation token 129. The secured resource 130 may determine whether that the attestation service 120, as indicated by the attestation token 129, is an authorized source. For example, the secured resource 130 may include a list of trusted or authorized attestation services that are permitted to generate authorization tokens to gain access to the secured resource 130. Based on a determination that the attestation service 120 is included in the list of trusted or authorized attestation services, the secured resource 130 may retrieve the secured data 134 from the data store 132 and send the secured data 134 to the compute instance 112.

In some alternative embodiments, the attestation service 120 may serve as an intermediary between the compute instance and the secured resource 130. The compute instance 112 may send a data request to the attestation service 120 in addition to the measurements from the TPM 114, according to some embodiments. The attestation service 120 may validate the measurements for the compute instance 112 in accordance with an attestation policy 123, as described herein. For example, the attestation service 120 may compare the current configuration 118 to the baseline configuration 124, as described herein. Responsive to a determination that the current configuration 118 has been validated, the attestation service 120 may generate an attestation token 129, as described herein.

The attestation service 120 may further include a data retriever 128 configured to access the secured resource 130 on behalf of the compute instance 112, according to some embodiments. The data retriever 128 may include one or more hardware components such as a network interface card device, a network controller, or any other device configured to manage network connections to another service or component of the provider network 160. In some embodiments, the data retriever 128 may be configured to generate an access request to retrieve secured data 134 from the secured resource 130. The data retriever 128 may identify the secured resource 130 based at least in part on the data request from the compute instance 112. The data retriever 128 may then generate the access request based on identification of the secured resource 130 as hosting the secured data 134. The access request may be generated according to the attestation token 129 as generated by the attestation service 120.

The data retriever 128 may send the access request to the secured resource 130, according to some embodiments. The secured resource 130 may process the access request to provide the secured data 134, as described herein. In response to the access request, the secured resource 130 may return the secured data 134 to the attestation service 120. In some embodiments, the attestation service 120 may then send the secured data 134 to a destination. For example, the attestation service 120 may send the secured data 134 to the compute instance 112 in response to the data request.

Figure 2:
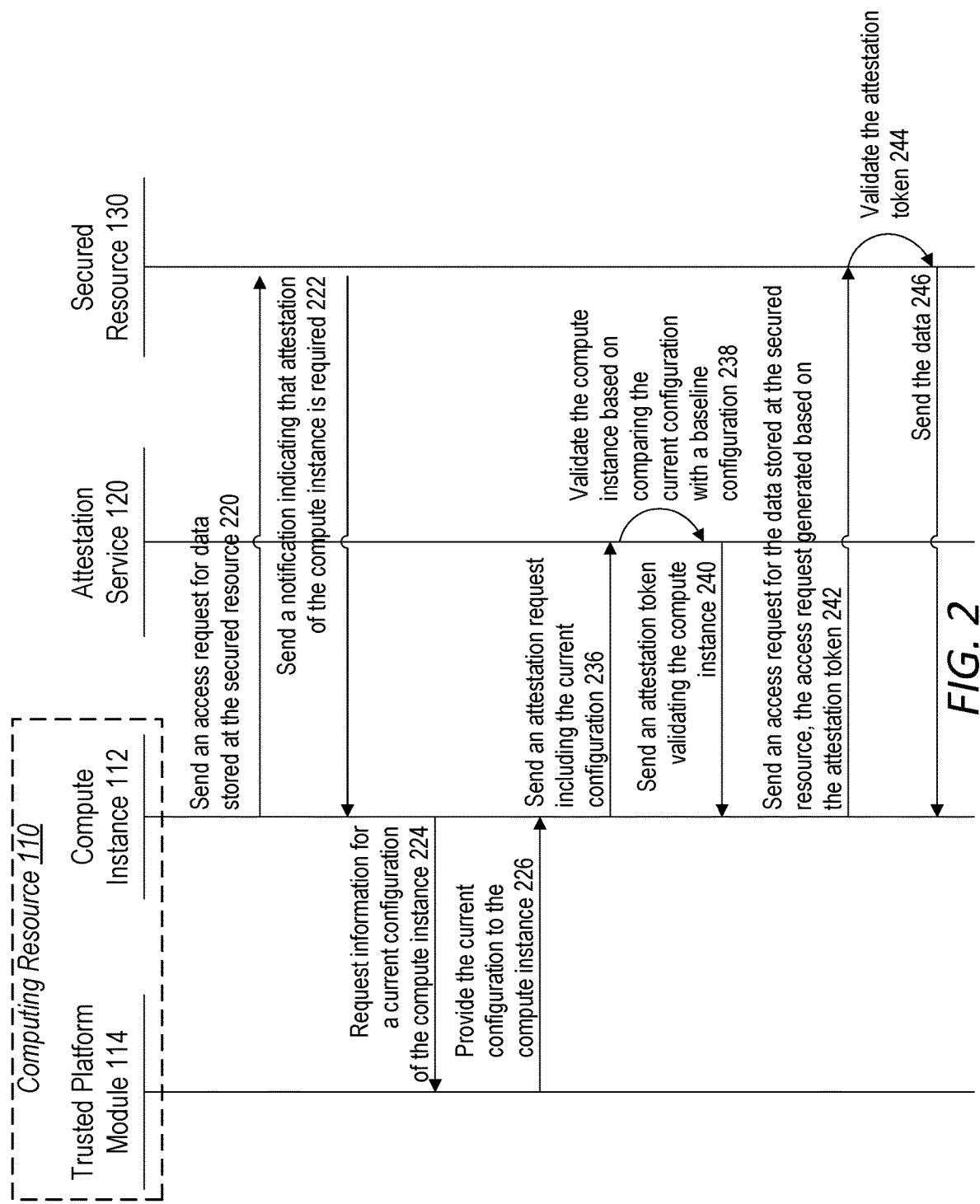
FIG. 2 is a diagram illustrating a data flow of the system, according to some embodiments.

FIG. 2 is a diagram illustrating a data flow 200 of the system 100, according to some embodiments. The data flow 200 represents one example implementation of one example embodiment of the system 100. The ordering of events depicted by the data flow 200 are illustrative and are not intended to be limiting.

The data flow 200 illustrates interactions between the computing resource 110, the attestation service 120 and the secured resource 130 of FIG. 1. The computing resource 110 may include the compute instance 112 and the trusted platform module (TPM) 114, according to some embodiments.

The compute instance 112 may be configured to send an access request for data stored at the secured resource 130, at 220. The data stored at the secured resource may include the secured data 134 of FIG. 1, according to some embodiments. The access request may initially be sent without an attestation token such that the compute instance 112 is not considered authenticated or attested to access the data.

In response to the access request without the attestation token, the secured resource 130 may send to the compute instance 112 a notification indicating that attestation of the compute instance 112 is required, at 222. The secured resource 130 may attempt to validate an attestation token, but the attempt may fail based on a determination that the attestation token has not been included as part of the access request.

The compute instance 112 may proceed by initiating a process to obtain an attestation token to access the secured resource 130. The compute instance 112 may request information indicating a current configuration 118, from the TPM 114, that includes one or more health measurement values that indicate a health status of the compute instance 112, at 224. In some embodiments, the compute instance 112 may generate and send a configuration request to the TPM 114. The TPM 114 may be configured to retrieve the current configuration 118 from platform configuration registers (PCRs) of the TPM 114, as described herein. The TPM 114 may be configured to send the current configuration to the compute instance 112 in response to the configuration request sent by the compute instance 112, according to some embodiments. The TPM 114 may provide the current configuration to the compute instance 112 in response to the request for the current configuration, at 226.

The compute instance 112 may receive the current configuration from the TPM 114 in response to the request, according to some embodiments. The compute instance 112 may send an attestation request including the current configuration to the attestation service 120, at 236. In some embodiments, the compute instance 112 may send the current configuration to the attestation service 120 as part of an attestation request.

The attestation service 120 may validate the compute instance 112 based at least in part on comparing the current configuration with a baseline configuration, at 238. In some embodiments, the baseline configuration may be indicated by an attestation policy of the attestation service 120. For example, the attestation service 120 may maintain the attestation policy to validate or attest the compute instance 112 and other compute instances to facilitate access to the secured resource 130. In some embodiments, the attestation service 120 may maintain multiple attestation policies for different compute instances or different secured resources.

In some cases, the attestation service 120 may determine that the compute instance 112 has failed validation based on the current configuration 118 not satisfying the baseline configuration 124. In some embodiments, the attestation service 120 may generate configuration parameters for the compute instance 112 that cause the compute instance 112 to limit its functionality. For example, the configuration parameters may cause the compute instance 112 to deny a data transaction, such as transferring data to or from the compute instance 112. The configuration parameters may be determined based on how the current configuration 118 was unable to satisfy the baseline configuration. For example, the configuration parameters may cause more limitations to the compute instance 112 based on a magnitude or difference of how far the current configuration 118 was from satisfying the baseline configuration 124. The configuration parameters may cause a quarantine on the compute instance 112 in order to allow the compute instance 112 to bring the current configuration 118 to a position where the compute instance 112 may satisfy the attestation policy 123.

Based on validating the compute instance 112, the attestation service 120 may generate an attestation token that validates the compute instance 112. The attestation service 120 may send the attestation token to the compute instance 112 in response to the attestation request, at 340.

The compute instance 112 may be configured to send, to the secured resource 130, another access request for the data stored at the secured resource 130, where the access request is generated based at least in part on the attestation token, at 242. For example, the compute instance 112 may be configured to generate the access request by including the attestation token as part of the access request. As another example, the compute instance 112 may be configured to generate the access request by including information from the attestation token, such as a security key or an identifier of the attestation service 120. As yet another example, the compute instance 112 be configured to generate the access request by including information indicating that the compute instance 112 is requesting the data from the secured resource 130.

The secured resource 130 may receive the access request from the compute instance 112, according to some embodiments. The secured resource may determine whether the compute instance 112 should be granted permission to access data at the secured resource 130 based on validating the attestation token, at 244. In some embodiments, the secured resource 130 may be configured to validate the attestation token based at least in part on a signature of the attestation token indicating a source of the attestation token. The signature of the attestation token may indicate that the attestation service 120 was the source of the attestation token. As an example, the secured resource 130 may determine whether the attestation service 120 is an approved source of attestation tokens. The secured resource 130 may maintain a list of approved sources of attestation tokens such that attestation tokens generated or provided by a source included on the list of approved sources are considered valid by the secured resource 130.

Based on validation of the attestation token, the secured resource 130 may grant the compute instance 112 access to the data stored at the secured resource 130. In some embodiments, the secured resource 130 may send the data as requested to the compute instance 112, at 246.

Figure 3:
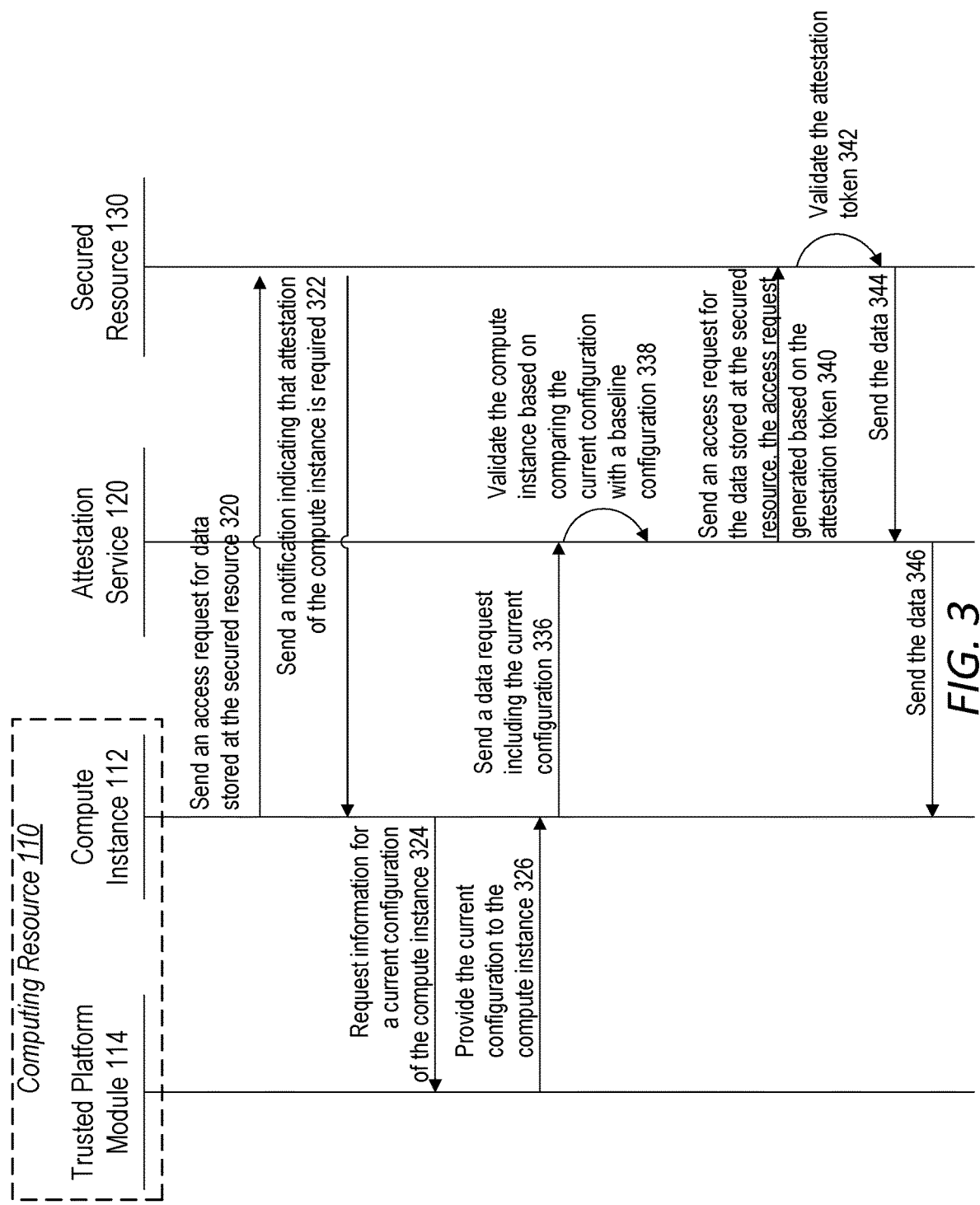
FIG. 3 is a diagram illustrating a data flow of the system, according to some embodiments.

FIG. 3 is a diagram illustrating a data flow 300 of the system 100, according to some embodiments. The data flow 300 represents one example implementation of one example embodiment of the system 100. The ordering of events depicted by the data flow 300 are illustrative and are not intended to be limiting.

The data flow 300 illustrates interactions between the computing resource 110, the attestation service 120 and the secured resource 130 of FIG. 1. The computing resource 110 may include the compute instance 112 and the trusted platform module (TPM) 114, according to some embodiments.

The compute instance 112 may be configured to send an access request for data stored at the secured resource 130, at 320. The data stored at the secured resource 130 may include the secured data 134 of FIG. 1, according to some embodiments. The access request may initially be sent without an attestation token such that the compute instance 112 is not considered authenticated or attested to access the data.

In response to the access request without the attestation token, the secured resource 130 may send to the compute instance 112 a notification indicating that attestation of the compute instance 112 is required, at 322. The secured resource 130 may attempt to validate an attestation token, but the attempt may fail based on a determination that the attestation token has not been included as part of the access request.

The compute instance 112 may proceed by initiating a process to obtain an attestation token to access the secured resource 130. The compute instance 112 may request information indicating a current configuration of the compute instance 112 (such as the current configuration 118 of FIG. 1), from the TPM 114, that includes one or more health measurement values that indicate a health status of the compute instance 112, at 324. In some embodiments, the compute instance 112 may generate and send a configuration request to the TPM 114. The TPM 114 may be configured to retrieve the current configuration 118 from platform configuration registers (PCRs) of the TPM 114, as described herein. The TPM 114 may be configured to send the current configuration to the compute instance 112 in response to the configuration request sent by the compute instance 112, according to some embodiments. The TPM 114 may provide the current configuration to the compute instance 112 in response to the request for the current configuration, at 326.

The compute instance 112 may receive the current configuration from the TPM 114 in response to the request, according to some embodiments. The compute instance 112 may send an attestation request including the current configuration to the attestation service 120, at 336. In some embodiments, the compute instance 112 may send the current configuration to the attestation service 120 as part of an attestation request. In some embodiments, the attestation request may also include a data request to obtain data from the secured resource 130. For example, the attestation service 120 may act as an intermediary between the compute instance 112 and the secured resource 130 such that the compute instance 112 would not necessarily need to directly access the secured resource 130 in order to obtain the data.

The attestation service 120 may validate the compute instance 112 based at least in part on comparing the current configuration with a baseline configuration, at 338. In some embodiments, the baseline configuration may be indicated by an attestation policy of the attestation service 120. For example, the attestation service 120 may maintain the attestation policy to validate or attest the compute instance 112 and other compute instances to facilitate access to the secured resource 130. In some embodiments, the attestation service 120 may maintain multiple attestation policies for different compute instances or different secured resources. For example, another compute instance of the compute instances 112 have a respective current configuration compared to another baseline configuration of another attestation policy.

Based on validating the compute instance 112, the attestation service 120 may generate an attestation token that validates the compute instance 112. The attestation service 120 may send an access request for the data stored at the secured resource 130, where the access request is generated based at least in part on the attestation token, at 340. For example, the attestation service 120 may be configured to generate the access request by including the attestation token as part of the access request. As another example, the attestation service 120 may be configured to generate the access request by including information from the attestation token, such as a security key or an identifier of the attestation service 120. As yet another example, the attestation service 120 may be configured to generate the access request by including information indicating that the compute instance 112 is requesting the data from the secured resource 130.

The secured resource 130 may receive the access request from the attestation service 120, according to some embodiments. The secured resource may determine whether the attestation service 120 should be granted permission to access data at the secured resource 130 based on validating the attestation token, at 342. In some embodiments, the secured resource 130 may be configured to validate the attestation token based at least in part on a signature of the attestation token indicating a source of the attestation token. The signature of the attestation token may indicate that the attestation service 120 was the source of the attestation token. As an example, the secured resource 130 may determine whether the attestation service 120 is an approved source of attestation tokens. The secured resource 130 may maintain a list of approved sources of attestation tokens such that attestation tokens generated or provided by a source included on the list of approved sources are considered valid by the secured resource 130.

Based on validation of the attestation token, the secured resource 130 may grant the attestation service 120 access to the data stored at the secured resource 130. In some embodiments, the secured resource 130 may send the data as requested to the attestation service 120, at 344. The attestation service 120 may then send the data as requested to the compute instance 112, at 346.

Figure 4:
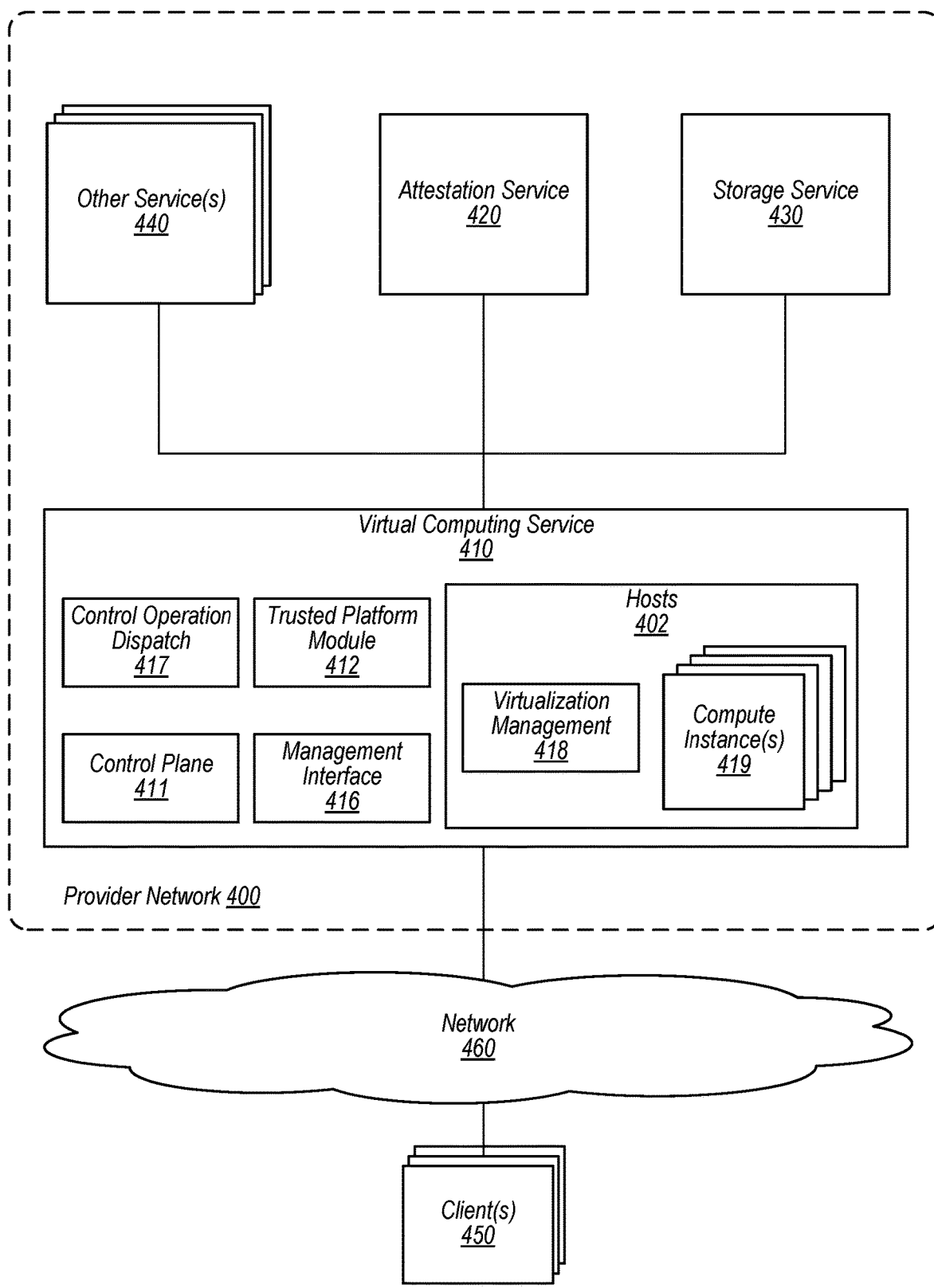
FIG. 4 is a block diagram of a provider network for managed attestation as a service, according to some embodiments.

FIG. 4 is a block diagram of provider network 400 for managed attestation as a service, according to some embodiments. The provider network 400 may be configured to provide various services to clients 450 via a network 460, according to some embodiments. The provider network 400 may include virtual computing service 110 configured to provide computing services. The provider network 460 may also include an attestation service 420, a storage service 430, and other services 440, according to some embodiments.

The provider network 400 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the provider network 400 via a publicly accessible network (e.g., the Internet, a cellular communication network). Regions are connected to a global network which includes private networking infrastructure (e.g., fiber connections controlled by the cloud provider) connecting each region to at least one other region. The provider network 400 may deliver content from points of presence outside of, but networked with, these regions by way of edge locations and regional edge cache servers. An edge location can be an extension of the cloud provider network outside of the traditional region/AZ context. For example an edge location can be a data center positioned to provide capacity to a set of customers within a certain latency requirement, a set of servers provided to a customer's premises, or a set of servers provided within (or forming part of) a cellular communications network, each of which can be controlled at least in part by the control plane of a nearby AZ or region. This compartmentalization and geographic distribution of computing hardware enables the provider network 400 to provide low-latency resource access to customers on a global scale with a high degree of fault tolerance and stability.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

As noted above, provider network 400 may implement various computing resources or services, such as a virtual compute service 410, block-based storage service 430, and other service(s) 440 which may be any other type of network based services, including various other types of storage (e.g., database service or an object storage service), data processing, analysis, communication, event handling, visualization, and security services not illustrated).

In various embodiments, the components illustrated in FIG. 4 may be implemented directly within computer hardware, as instructions directly or indirectly executable by computer hardware (e.g., a microprocessor or computer system), or using a combination of these techniques. For example, the components of FIG. 4 may be implemented by a system that includes a number of computing nodes (or simply, nodes), each of which may be similar to the computer system embodiment illustrated in FIG. 9 and described below. In various embodiments, the functionality of a given system or service component (e.g., a component of data storage service 430) may be implemented by a particular node or may be distributed across several nodes. In some embodiments, a given node may implement the functionality of more than one service system component (e.g., more than one data store component).

Virtual computing service 410 may offer virtualized computing resources (e.g., virtual compute instances) and according to various configurations for client(s) 450 operation. For example, various host systems 402, which may offer different capabilities and features for hosted virtual computes instances, may serve as hosts for one or more virtual compute instance(s) 419. Hosts 402 may implement virtualization management 418 to support and/or otherwise provide the execution framework to host instances and may include, for example, various different hypervisors or other virtualization software, firmware, and/or hardware that can host virtual compute instances (e.g., virtual machines). Virtualization management 418 may implement the workflows, tasks, or other operations to handle virtual compute instance management requests, including, but not limited to start, stop, pause, and resume.

In various embodiments, virtual compute instance(s) 419 may be implemented with a specified computational capacity (which may be specified by indicating the type and number of CPUs, the main memory size, and so on) and a specified software stack (e.g., a particular version of an operating system, which may in turn run on top of a hypervisor). Hosts 402 may be a number of different types of computing devices, used singly or in combination, to host the virtual compute instances 419, including general purpose or special purpose computer servers, storage devices, network devices and the like. In some embodiments client(s) 450 or other any other user may be configured (and/or authorized) to direct network traffic to a virtual compute instance 419.

In one embodiment, each of the virtual compute instances 419 may correspond to one of several instance families. An instance family may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, or a non-burstable or dedicated instance type that is allotted and guaranteed a fixed quantity of resources). Each instance family can have a specific ratio of processing, local storage, memory, and networking resources, and different instance families may have differing types of these resources as well. Multiple sizes of these resource configurations can be available within a given instance family, referred to as "instance types." Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

Virtual compute instances 419 may operate or implement a variety of different frameworks, such as application server instances, general purpose or special-purpose operating systems, platforms that support various interpreted or compiled programming languages such as Ruby, Perl, Python, C, C++ and the like, or high-performance computing platforms) suitable for performing client(s) 450 applications, without, for example, requiring the client(s) 450 to access an instance. Applications (or other software operated/implemented by a virtual compute instance 419 and may be specified by client(s), such as custom and/or off-the-shelf software.

In some embodiments, virtual compute instances 419 may have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a virtual compute instance 419 for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires a virtual compute instance 419 to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances 419, with a corresponding pricing policy, may be supported in some embodiments as well, where the upfront costs and the per-hour costs fall between the corresponding High Uptime Ratio and Low Uptime Ratio costs.

Virtual compute instance configurations may also include virtual compute instances 419 with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of virtual compute instances 419 may also include their location, in a particular data center, availability zone, geographic, location, etc., and (in the case of reserved compute instances) reservation term length.

Virtual computing service 410 may implement control plane 411, which may include various features to manage hosts 402 and instance(s) 419 on behalf of client(s) 450, in some embodiments. For example, control plane 411 may implement various performance monitoring to ensure performance guarantees for instance(s), such as those specified by Service Level Agreements (SLAs) are met. Control plane 411 may also implement a management interface 416, which may support various operations to configure or enable features, deploy, start, stop, pause, resume, or other controls for instance(s) 411. Control operation dispatch 417 may implement various workflows or invoke various microservices (not illustrated). Control plane 411 may also support various features related to implementing managed attestation as a service.

Interface 416 may include various types of interfaces, such as a command line interface, graphical user interface, and/or programmatic interface (e.g., Application Programming Interfaces (APIs)) in order to perform requested operations. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

Provider network 400 may also implement block-based storage service 430, in various embodiments, for performing storage operations. Block-based storage service 430 may be a storage system that provides block level storage for storing one or more sets of data volumes of data that may be mapped to particular clients (e.g., a virtual compute instance of virtual compute service 410), providing virtual block-based storage (e.g., hard disk storage or other persistent storage) as a contiguous set of logical blocks. In some embodiments, block-based storage service 430 may store data 434 in a data store 432.

Generally speaking, clients 450 may encompass any type of client configurable to submit network-based requests to provider network 400 via network 450, including requests for storage services (e.g., a request to create a replication job in migration service 430, etc.). For example, a given client 450 may include a suitable version of a web browser or may include a plug-in module or other type of code module that may execute as an extension to or within an execution environment provided by a web browser. Alternatively, a client 450 may encompass an application (or user interface thereof), a media application, an office application or any other application that may make use of resources in provider network 400 to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 450 may be an application may interact directly with provider network 400. In some embodiments, client 450 may generate network-based services requests according to a Representational State Transfer (REST)-style network-based services architecture, a document- or message-based network-based services architecture, or another suitable network-based services architecture.

In some embodiments, a client 450 may provide access to provider network 400 to other applications in a manner that is transparent to those applications. For example, client 450 may integrate with an operating system or file system to provide storage on a data storage service (e.g., a block-based storage service 430). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service may be coordinated by client 450 and the operating system or file system on behalf of applications executing within the operating system environment.

Clients 450 may convey network-based services requests to and receive responses from provider network 400 via network 460. In various embodiments, network 460 may encompass any suitable combination of networking hardware and protocols necessary to establish network-based-based communications between clients 450 and provider network 400. For example, network 460 may generally encompass the various telecommunications networks and service providers that collectively implement the Internet. Network 460 may also include private networks such as local area networks (LANs) or wide area networks (WANs) as well as public or private wireless networks. For example, both a given client 450 and provider network 400 may be respectively provisioned within enterprises having their own internal networks. In such an embodiment, network 460 may include the hardware (e.g., modems, routers, switches, load balancers, proxy servers, etc.) and software (e.g., protocol stacks, accounting software, firewall/security software, etc.) necessary to establish a networking link between given client 450 and the Internet as well as between the Internet and provider network 400. It is noted that in some embodiments, clients 450 may communicate with provider network 400 using a private network rather than the public Internet.

In some embodiments, provider network 400 may include the hardware (e.g., modems, routers, switches, load balancers, proxy servers, etc.) and software (e.g., protocol stacks, accounting software, firewall/security software, etc.) necessary to establish a networking links between different components of provider network 400, such as virtualization hosts, control plane components as well as external networks 460 (e.g., the Internet). In some embodiments, provider network 400 may employ an Internet Protocol (IP) tunneling technology to provide an overlay network via which encapsulated packets may be passed through the internal network using tunnels. The IP tunneling technology may provide a mapping and encapsulating system for creating an overlay network and may provide a separate namespace for the overlay layer and the internal network layer. Packets in the overlay layer may be checked against a mapping directory to determine what their tunnel target should be. The IP tunneling technology provides a virtual network topology; the interfaces that are presented to clients 450 may be attached to the overlay network so that when a client 450 provides an IP address that they want to send packets to, the IP address is run in virtual space by communicating with a mapping service that knows where the IP overlay addresses are.

Figure 5:
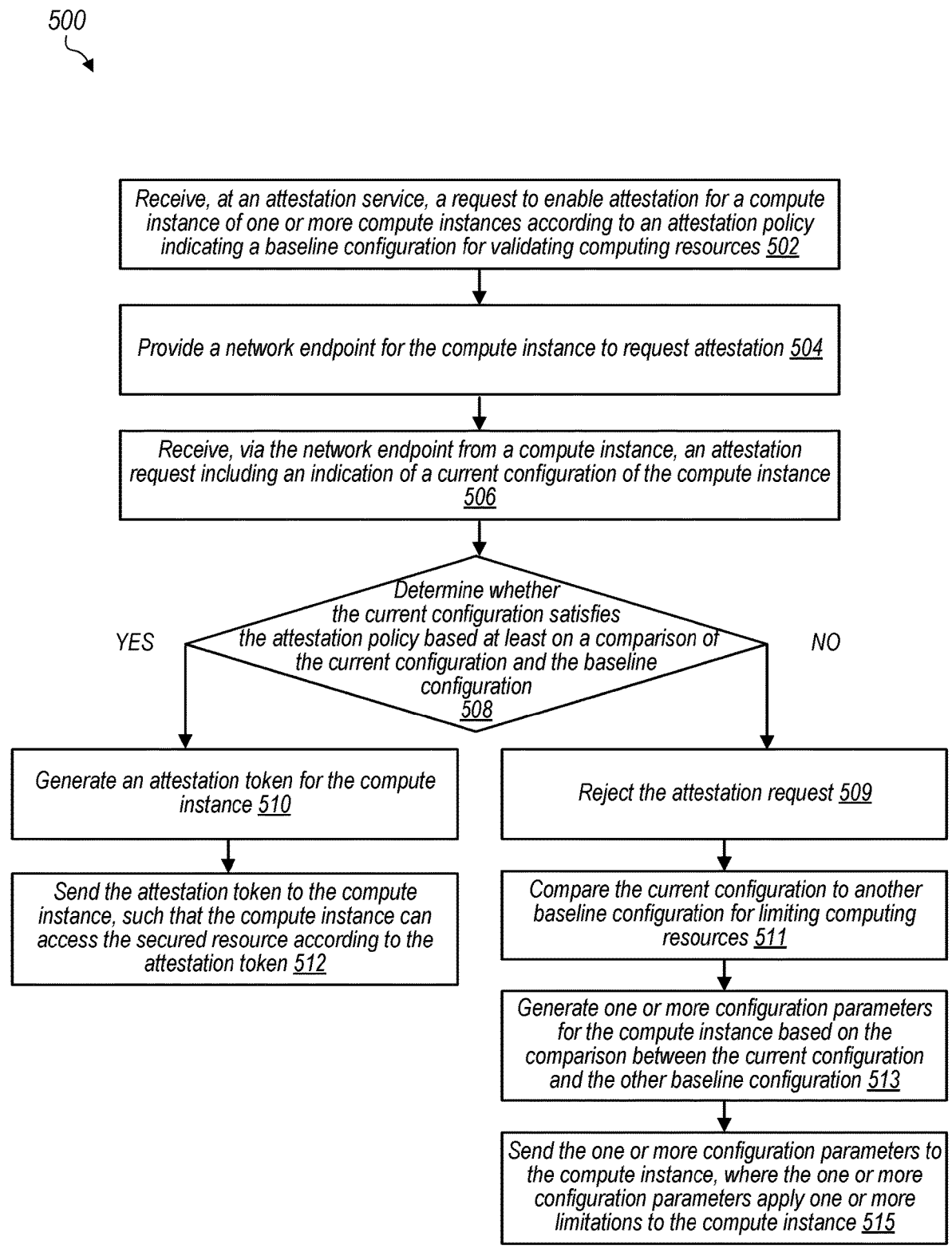
FIG. 5 is a flowchart diagram for a method for an attestation service attesting a compute instance, according to some embodiments.

FIG. 5 is a flowchart diagram for a method 500 for an attestation service attesting a compute instance, according to some embodiments. The method 500 may be performed by one or more processors executing instructions stored on a memory. The attestation service may correspond to the attestation service 120 of FIGS. 1-3 or the attestation service 420 of FIG. 4, in various embodiments. The compute instance may correspond to the compute instance 112 of FIGS. 1-3 or the compute instance 419 of FIG. 4, in various embodiments.

The method 500 includes receiving, at the attestation service, a request to enable attestation for a compute instance of one or more compute instances according to an attestation policy indicating a baseline configuration for validating computing resources, at 502. In some embodiments, the attestation service may include a control plane to receive requests to enable attestation for compute instances. For example, the control plane may implement an API in order to receive requests from clients or compute instances.

The method 500 includes providing a network endpoint for the compute instance to request attestation, at 504. In some embodiments, the network endpoint may correspond to the network endpoint 127 of FIG. 1. The attestation service may provide information indicating the network input to the compute instance such that the compute instance is able to interact with the attestation service via one or more APIs.

The method 500 includes receiving, via the network endpoint from the compute instance, an attestation request including an indication of a current configuration of the compute instance, at 506. In some embodiments, the current configuration of the compute instance may include one or more current health measurement values that were maintained and recorded by a TPM, such as the TPM 114 of FIGS. 1-3 or TPM 414 of FIG. 4. In some embodiments, the compute instance may send the attestation request to obtain attestation of the compute instance from the attestation service. The attestation may be required by another resource such as secured resource 130 of FIGS. 1-3 or storage service 430 of FIG. 4.

The method 500 includes determining whether the current configuration satisfies the attestation policy based at least on a comparison of the current configuration and the baseline configuration, at 508. In some embodiments, the attestation service may be configured to compare the current configuration and the baseline configuration. For example, the attestation service may be configured to compare one or more current health measurement values indicated in the current configuration with one or more baseline health measurement values indicated in the baseline configuration.

Based on a determination that the current configuration satisfies the attestation policy, the method 500 includes generating an attestation token for the compute instance, at 510. The attestation token may correspond to the attestation token 129 of FIG. 1, according to some embodiments. In some embodiments, the attestation service may be configured to generate the attestation token in accordance with a cryptographic standard. The attestation token may include information indicating that the attestation token was generated on behalf of the compute instance. The attestation token may include information indicating that the attestation token was generated on behalf of a client that has control over the compute instance. The attestation token may include information indicating that the attestation service generated the attestation token, such as a signature.

The method 500 concludes by sending the attestation token to the compute instance, such that the compute instance can access the secured resource according to the attestation token, at 512. In some embodiments, the attestation service may return the attestation token in response to the attestation request sent by the compute instance. The attestation service may be configured to return the attestation token via the network endpoint that received the attestation request from the compute instance. In other embodiments, the attestation service may push the attestation token via an alternate communication channel. In yet other embodiments, the attestation service may store the attestation token to a storage location at which the compute instance has access.

Based on a determination that the current configuration does not satisfy the attestation policy, the method 500 includes rejecting the attestation request, at 509. In some embodiments, the attestation service may be configured to send a notification to the compute instance indicating that the attestation request has failed. For example, the attestation service may send a notification indicating that the compute instance does not satisfy the attestation policy because the current configuration does not satisfy the baseline configuration.

The method 500 may also include comparing the current configuration to another baseline configuration for limiting computing resources, at 511. In some embodiments, the attestation service may analyze the current configuration in view of the attestation policy having another baseline configuration that, if satisfied, would cause limitations in the functionality of the compute instance.

The method 500 includes generating one or more configuration parameters for the compute instance based on the comparison between the current configuration and the other baseline configuration, at 513. For example, the one or more configuration parameters may be generated based at least in part on how the current configuration satisfied the other baseline configuration. In some embodiments, the configuration parameters may be generated further based on how the current configuration did not satisfy the baseline configuration. For example, the configuration parameters may be generated based on a severity of how the compute instance is unable to satisfy the baseline configuration or the other baseline configuration.

The method 500 concludes by sending the one or more configuration parameters to the compute instance, where the one or more configuration parameters apply one or more limitations to the compute instance, at 515.

FIG. 6 is a flowchart diagram depicting a method 600 for a compute instance requesting attestation to retrieve data from a secured resource, according to some embodiments. The method 600 may be performed by one or more processors executing instructions stored on a memory. The compute instance may correspond to the compute instance 112 of FIGS. 1-3 or the compute instance 419 of FIG. 4, in various embodiments.

The method 600 includes sending, to a trusted platform module (TPM) from the compute instance, a request for information indicating a current configuration for the compute instance, at 602. The method 600 includes receiving, at the compute instance from the trusted platform module, information indicating the current configuration for the compute instance, at 604. The TPM may correspond to the TPM 114 of FIGS. 1-3 or TPM 414 of FIG. 4, according to some embodiments. The compute instance may be configured to send the request for information to the TPM via an internal connection that is accessible via one or more computing resources that implement the compute instance. The TPM may be configured to store the information indicating the current configuration in one or more PCRs, according to some embodiments. The current configuration may include one or more health measurement values that may indicate a health status of various components or aspects of the compute instance. The TPM may be configured to monitor the compute instance to store information indicating the current configuration to the PCRs.

The method 600 includes sending an attestation request to a network endpoint of an attestation service, the attestation request including the information indicating the current configuration for the compute instance, at 606. The compute instance may generate the attestation request in accordance with an API for interfacing with the network endpoint provided by the attestation service, according to some embodiments. For example, the attestation request may include arguments that conform to the API.

The method 600 includes receiving, at the compute instance from the attestation service, an attestation token for the compute instance, at 608. The attestation may be configured to generate the attestation token based at least in part on determining whether the current configuration of the compute instance satisfies an attestation policy maintained at the attestation service, according to some embodiments. The attestation token may include information indicating that the attestation token was generated on behalf of the compute instance. The attestation token may include information indicating that the attestation token was generated on behalf of a client that has control over the compute instance. The attestation token may include information indicating that the attestation service generated the attestation token, such as a signature.

The method 600 includes sending, from the compute instance to a secured resource, an access request for data stored at the secured resource, the access request including at least a portion of the attestation token, at 610. The access request may identify the data and the secured resource as the targets of the access request. The access request may be generated to conform with an API provided by the secured resource to obtain data from the secured resource, according to some embodiments. The compute instance may be configured to generate the access request in accordance with the attestation token, according to some embodiments. For example, the compute instance may generate the access request by including the attestation token as part of the access request. As another example, the compute instance may generate the access request by including data from the attestation token as part of the access request, such as a key value or signature. The access request may include information indicating a source of the attestation token, according to some embodiments. For example, the access request may indicate that the attestation service was the source of the attestation token. As another example, the access request may indicate that the attestation service generated the attestation token. The access request may indicate that the compute instance is the requester of the data at the secured resource.

The method 600 concludes by receiving, at the compute instance from the secured resource, the requested data, at 612. The compute instance may have access to computing resources that provide storage for the requested data. The compute instance may perform data operations with the requested data.

Figure 7:
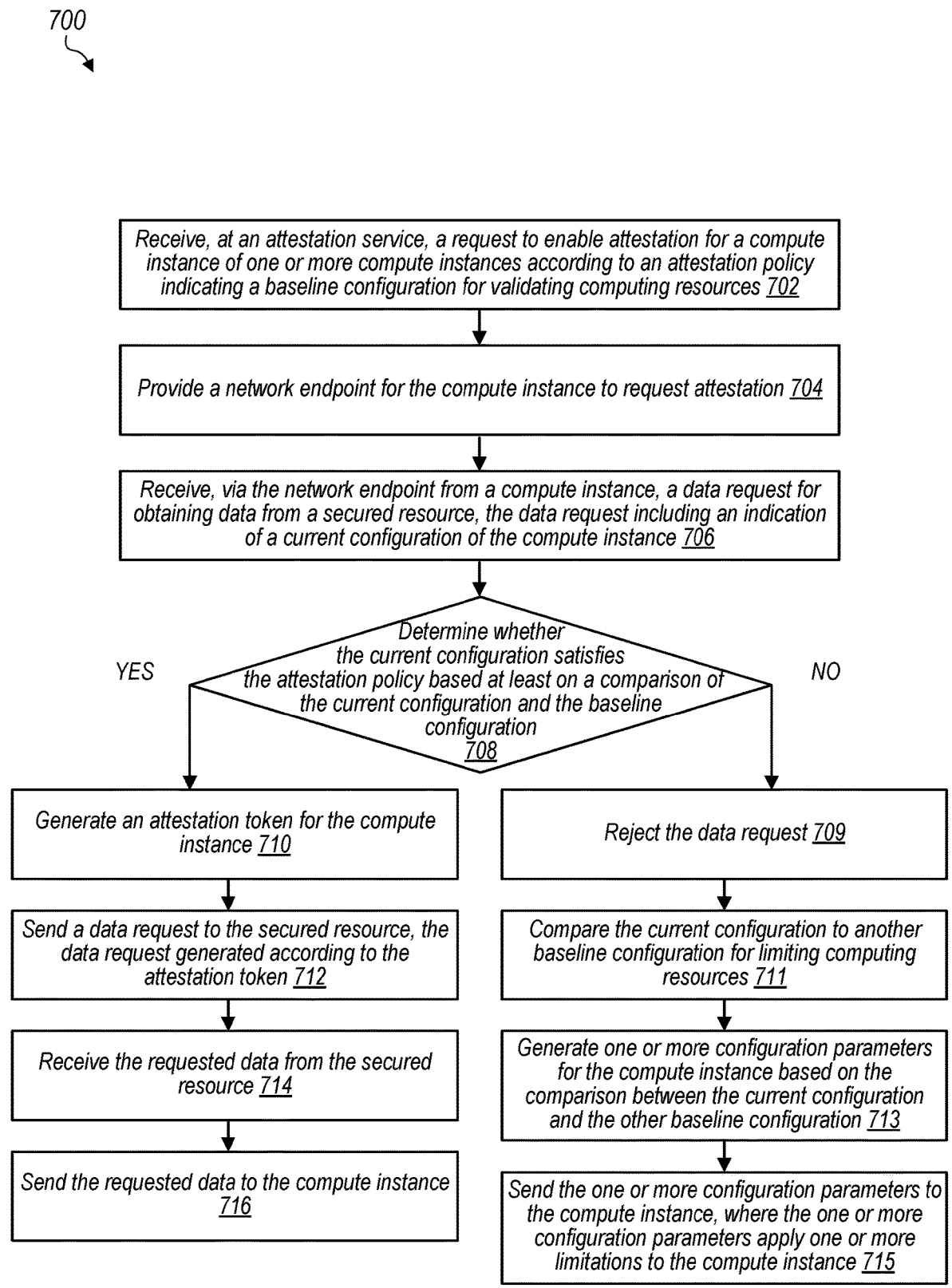
FIG. 7 is a flowchart diagram for a method for an attestation service attesting a compute instance and retrieving data on behalf of the compute instance, according to some embodiments.

FIG. 7 is a flowchart diagram for a method 700 for an attestation service attesting a compute instance and retrieving data on behalf of the compute instance, according to some embodiments. The method 700 may be performed by one or more processors executing instructions stored on a memory. The attestation service may correspond to the attestation service 120 of FIGS. 1-3 or the attestation service 420 of FIG. 4, in various embodiments. The compute instance may correspond to the compute instance 112 of FIGS. 1-3 or the compute instance 419 of FIG. 4, in various embodiments.

The method 700 includes receiving, at an attestation service, a request to enable attestation for a compute instance of one or more compute instances according to an attestation policy indicating a baseline configuration for validating computing resources, at 702. In some embodiments, the attestation service may include a control plane to receive requests to enable attestation for compute instances. For example, the control plane may implement an API in order to receive requests from clients or compute instances.

The method 700 includes providing a network endpoint for the compute instance to request attestation, at 702. In some embodiments, the network endpoint may correspond to the network endpoint 127 of FIG. 1. The attestation service may provide information indicating the network input to the compute instance such that the compute instance is able to interact with the attestation service via one or more APIs.

The method 700 includes receiving, via the network endpoint from a compute instance, a data request for obtaining data from a secured resource, the data request including an indication of a current configuration of the compute instance, at 704. The data request may identify the data and the secured resource as being a target of the data request. In some embodiments, the current configuration of the compute instance may include one or more current health measurement values that were maintained and recorded by a TPM, such as the TPM 114 of FIGS. 1-3 or TPM 414 of FIG. 4. In some embodiments, the compute instance may send the attestation request to obtain attestation of the compute instance from the attestation service. The attestation may be required by another resource such as secured resource 130 of FIGS. 1-3 or storage service 430 of FIG. 4.

The method 700 includes determining whether the current configuration satisfies the attestation policy based at least on a comparison of the current configuration and the baseline configuration, at 706. In some embodiments, the attestation service may be configured to compare the current configuration and the baseline configuration. For example, the attestation service may be configured to compare one or more current health measurement values indicated in the current configuration with one or more baseline health measurement values indicated in the baseline configuration.

Based on a determination that the current configuration satisfies the attestation policy, the method 700 includes generating an attestation token for the compute instance, at 708. The attestation token may correspond to the attestation token 129 of FIG. 1, according to some embodiments. In some embodiments, the attestation service may be configured to generate the attestation token in accordance with a cryptographic standard. The attestation token may include information indicating that the attestation token was generated on behalf of the compute instance. The attestation token may include information indicating that the attestation token was generated on behalf of a client that has control over the compute instance. The attestation token may include information indicating that the attestation service generated the attestation token, such as a signature.

The method 700 includes sending a data request to the secured resource, the data request generated according to the attestation token, at 710. The data request may identify the data and the secured resource as the targets of the data request. The data request may be generated to conform with an API provided by the secured resource to obtain data from the secured resource, according to some embodiments. The attestation service may be configured to generate the data request in accordance with the attestation token, according to some embodiments. For example, the attestation service may generate the data request by including the attestation token as part of the data request. As another example, the attestation service may generate the data request by including data from the attestation token as part of the data request, such as a key value or signature. The data request may include information indicating a source of the attestation token, according to some embodiments. For example, the data request may indicate that the attestation service was the source of the attestation token. As another example, the data request may indicate that the attestation service generated the attestation token. The data request may indicate that the compute instance is the requester of the data at the secured resource.

The method 700 includes receiving the requested data from the secured resource, at 712. The attestation service may have access to computing resources that provide storage for the requested data. The method 700 concludes by sending the requested data to the compute instance, at 714. In some embodiments, the attestation service may return the requested data in response to the data request from the compute instance via the network endpoint.

Based on a determination that the current configuration does not satisfy the attestation policy, the method 700 includes rejecting the attestation request, at 709. In some embodiments, the attestation service may be configured to send a notification to the compute instance indicating that the attestation request has failed. For example, the attestation service may send a notification indicating that the compute instance does not satisfy the attestation policy because the current configuration does not satisfy the baseline configuration.

The method 700 may also include comparing the current configuration to another baseline configuration for limiting computing resources, at 711. In some embodiments, the attestation service may analyze the current configuration in view of the attestation policy having another baseline configuration that, if satisfied, would cause limitations in the functionality of the compute instance.

The method 700 includes generating one or more configuration parameters for the compute instance based on the comparison between the current configuration and the other baseline configuration, at 713. For example, the one or more configuration parameters may be generated based at least in part on how the current configuration satisfied the other baseline configuration. In some embodiments, the configuration parameters may be generated further based on how the current configuration did not satisfy the baseline configuration. For example, the configuration parameters may be generated based on a severity of how the compute instance is unable to satisfy the baseline configuration or the other baseline configuration.

The method 700 concludes by sending the one or more configuration parameters to the compute instance, where the one or more configuration parameters apply one or more limitations to the compute instance, at 715.

Figure 8:
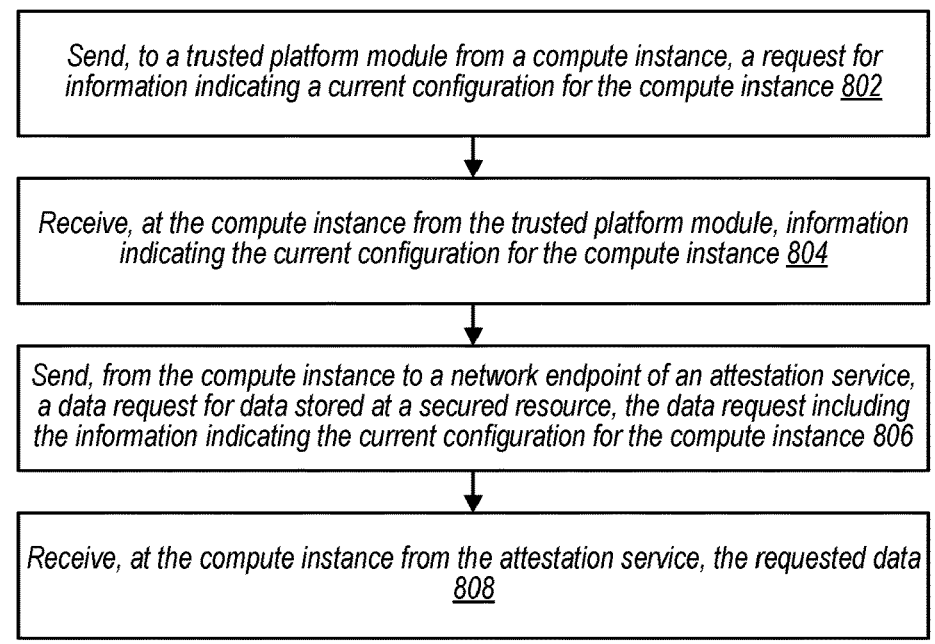
FIG. 8 is a flowchart diagram depicting a method for a compute instance requesting attestation to retrieve data from a secured resource, according to some embodiments.

FIG. 8 is a flowchart diagram depicting a method 800 for a compute instance requesting attestation to retrieve data from a secured resource, according to some embodiments. The method 800 may be performed by one or more processors executing instructions stored on a memory. The compute instance may correspond to the compute instance 112 of FIGS. 1-3 or the compute instance 419 of FIG. 4, in various embodiments.

The method 800 includes sending, to a trusted platform module from a compute instance, a request for information indicating a current configuration for the compute instance, at 802. The method 800 includes receiving, at the compute instance from the trusted platform module, information indicating the current configuration for the compute instance, at 804. The TPM may correspond to the TPM 114 of FIGS. 1-3 or TPM 414 of FIG. 4, according to some embodiments. The compute instance may be configured to send the request for information to the TPM via an internal connection that is accessible via one or more computing resources that implement the compute instance. The TPM may be configured to store the information indicating the current configuration in one or more PCRs, according to some embodiments. The current configuration may include one or more health measurement values that may indicate a health status of various components or aspects of the compute instance. The TPM may be configured to monitor the compute instance to store information indicating the current configuration to the PCRs.

The method 800 includes sending, from the compute instance to a network endpoint of an attestation service, a data request for data stored at a secured resource, the data request including the information indicating the current configuration for the compute instance, at 806. The compute instance may generate the data request in accordance with an API for interfacing with the network endpoint provided by the attestation service, according to some embodiments. For example, the data request may include arguments that conform to the API. The data request may identify the data and the secured resource as being a target of the data request.

The method 800 concludes by receiving, at the compute instance from the attestation service, the requested data, at 808. The compute instance may have access to computing resources that provide storage for the requested data. The compute instance may perform data operations with the requested data.

Figure 9:
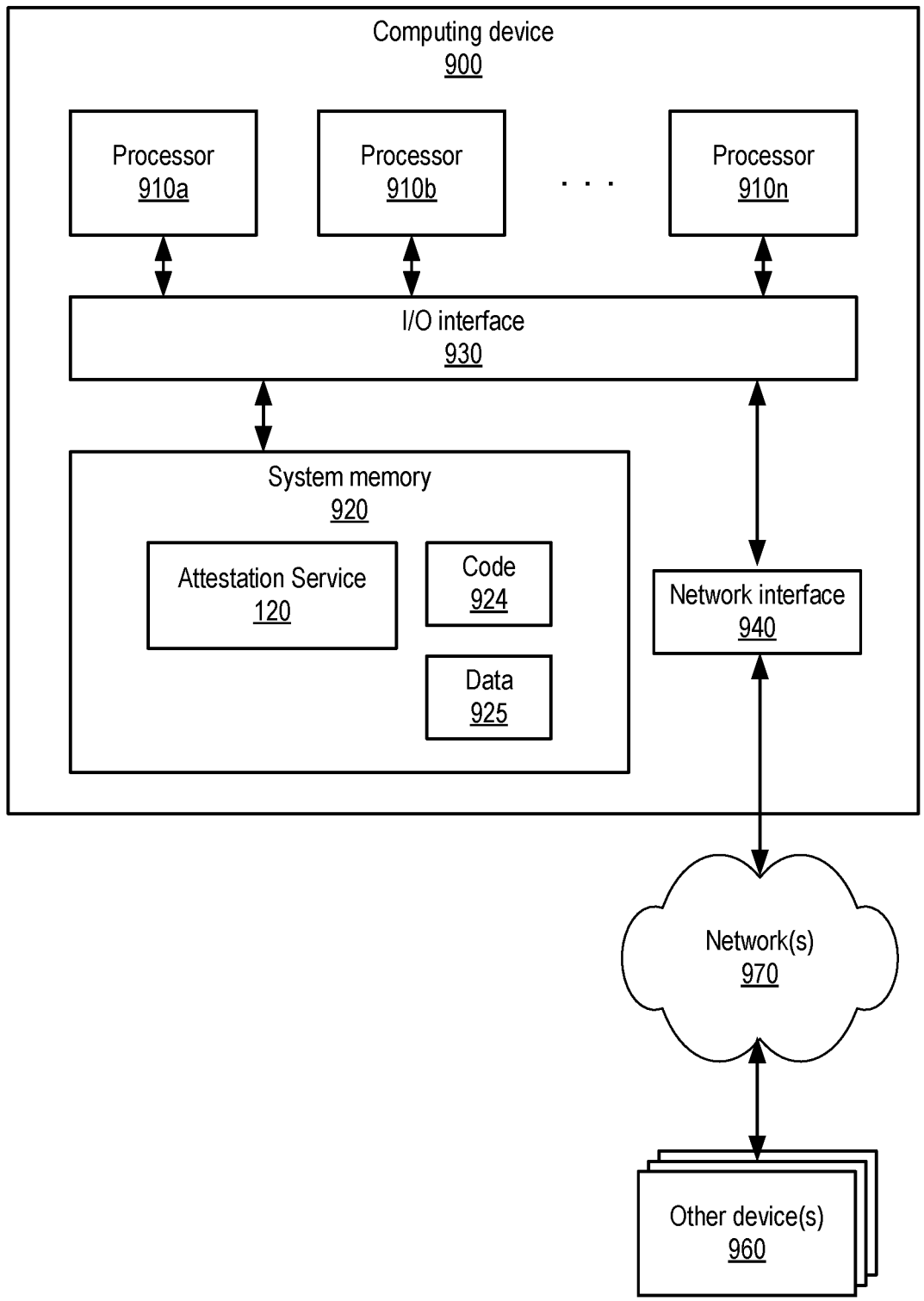
FIG. 9 is a block diagram illustrating an example computer system that may be used in some embodiments.

Any of various computer systems may be configured to implement techniques for managing memory compression in a secure manner, as disclosed herein. For example, FIG. 9 is a block diagram illustrating one embodiment of a computer system suitable for implementing some or all of the techniques and systems described herein. For example, each of the computer systems may host one or more respective containers. In some cases, a host computer system may host multiple containers. In various embodiments, the provider network may include one or more computer systems 900 such as that illustrated in FIG. 9 or one or more components of the computer system 900 that function in a same or similar way as described for the computer system 900.

In the illustrated embodiment, computer system 900 includes one or more processors 910 coupled to a system memory 920 via an input/output (I/O) interface 930. Computer system 900 further includes a network interface 940 coupled to I/O interface 930. In some embodiments, computer system 900 may be illustrative of servers implementing enterprise logic or downloadable application, while in other embodiments servers may include more, fewer, or different elements than computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions on or across the processors 910. For example, in various embodiments, processors 910 may be embedded processors implementing any of a variety of instruction set architectures (ISAs), such as the x86, x86-64, ARM, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor 910. In various embodiments, system memory 920 may be implemented using one or more of any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the management of securely memory compression are shown stored within system memory 920 as program instructions 924. In some embodiments, system memory 920 may include data 925 which may be configured as described herein. In some embodiments, system memory 920 may include an attestation service 120. For example, attestation service 120 may perform the functions of attestation service 120 of FIGS. 1-3, the functions of the attestation service 420 of FIG. 4, the method 500 of FIG. 5, or the method 700 of FIG. 7.

In one embodiment, I/O interface 930 may be configured to coordinate I/O traffic between processor 910, system memory 920 and any peripheral devices in the system, including through network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments, some or all of the functionality of I/O interface 930, such as an interface to system memory 920, may be incorporated directly into processor 910.

Network interface 940 may be configured to allow data to be exchanged between computer system 900 and other devices attached to a network, such as between client devices (e.g., 960, etc.) and other computer systems, or among hosts, for example. In particular, network interface 940 may be configured to allow communication between computer system 900 and/or various other devices 960 (e.g., I/O devices). Other devices 960 may include scanning devices, display devices, input devices and/or other communication devices, as described herein. Network interface 940 may commonly support one or more wireless networking protocols (e.g., Wi-Fi/IEEE 802.11, or another wireless networking standard). However, in various embodiments, network interface 940 may support communication via any suitable wired or wireless general data networks 970, such as other types of Ethernet networks, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 900 via I/O interface 930. A computer-readable storage medium may also include any volatile or non-volatile media such as RAM (e.g. SDRAM, DDR SDRAM, RDRAM, SRAM, etc.), ROM, etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, which may be implemented via network interface 940.

In some embodiments, I/O devices may be relatively simple or "thin" client devices. For example, I/O devices may be configured as dumb terminals with display, data entry and communications capabilities, but otherwise little computational functionality. However, in some embodiments, I/O devices may be computer systems configured similarly to computer system 900, including one or more processors 910 and various other devices (though in some embodiments, a computer system 900 implementing an I/O device 950 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 900. In general, an I/O device (e.g., cursor control device, keyboard, or display(s) may be any device that can communicate with elements of computing system 900.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on one or more computer-readable storage media coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending, or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
    a plurality of computer devices comprising respective processors and memory and configured to implement an infrastructure provider network to provide a plurality of services, including:
        a virtual computing service comprising a first plurality of computing devices configured to respectively host compute instances allocated to a client, wherein the virtual computing service implements a management interface configured to receive client configuration of the compute instances that specify a baseline configuration of the compute instances, wherein the baseline configuration includes one or more configuration or health parameters that represent a security criterion for validating a compute instance to access a secured resource of the infrastructure provider network; and an attestation service comprising a second plurality of computing devices, the attestation service configured to:
    receive, via the management interface, a request to enable attestation for the compute instance managed by the virtual computing service according to an attestation policy, wherein the attestation policy indicates to use the baseline configuration to validate the compute instance;
    provide a network endpoint for the compute instance to request attestation;
    receive, via the network endpoint from the compute instance, one or more current health measurement values indicating a current health status of the compute instance, wherein the current health measurement values of the compute instance are obtained repeatedly during a run time for the compute instance and monitored based on a trusted platform module for the compute instance;
    validate the compute instance, including the current health status of the compute instance, based at least on a comparison of one or more current health measurement values and one or more baseline health measurement values indicated in the baseline configuration; and
    in response to validating the compute instance, generate an attestation token indicating that the compute instance is validated to access the secured resource of the infrastructure provider network.

2. The system of claim 1, wherein the attestation service is further configured to:
send the attestation token to the compute instance; and
wherein the compute instance is configured to:
    send an access request to the secured resource for data stored at the secured resource, the access request generated according to the attestation token; and
    receive data from the secured resource in accordance with the access request.

3. The system of claim 1, wherein the attestation service is further configured to:
send an access request to the secured resource, the access request generated according to the attestation token;
receive data from the secured resource in accordance with the access request; and
send the data to the compute instance.

4. The system of claim 1, wherein:
the trusted platform module is configured to store the one or more current health measurement values of the compute instance in one or more platform configuration registers; and
the compute instance is configured to:
    obtain the one or more current health measurement values from the trusted platform module; and
    send the one or more current health measurement values to the attestation service.

5. The system of claim 1, further comprising the secured resource, wherein the secured resource is configured to:
receive an access request to retrieve data from the secured resource, wherein the access request comprises the attestation token;
validate the attestation token based at least on determining whether the attestation token was generated by a trusted attestation service; and
in response to validation of the attestation token, send the data responsive to the access request.

6. A method, comprising:
executing a virtual computing service comprising one or more computing devices configured to respectively host compute instances allocated to a client, wherein the virtual computing service implements a management interface configured to receive client configuration of the compute instances that specify a baseline configuration of the compute instances, wherein the baseline configuration includes one or more configuration or health parameters that represent a security criterion for validating a compute instance to access a secured resource; and
receiving, via the management interface and at an attestation service comprising one or more computing devices, a request to enable attestation for the compute instance according to an attestation policy, wherein the attestation policy indicates to use the baseline configuration to validate the compute instance;
providing, by the attestation service, a network endpoint for the compute instance to perform request attestation of the compute instance;
validating, by the attestation service, a current configuration and health status of the compute instance received via the network endpoint based, at least in part on, a comparison of one or more current health measurement values of the compute instance with one or more baseline health measurement values indicated in the baseline configuration in the attestation policy, wherein the one or more current health measurement values are obtained repeatedly during a run time for the compute instance and monitored based on a trusted platform module for the compute instance; and
generating, by the attestation service, an attestation token indicating that a compute instance is validated to access the secured resource upon providing the attestation token to the secured resource.

7. The method of claim 6, further comprising:
sending the attestation token to the compute instance.

8. The method of claim 6, further comprising:
sending an access request to the secured resource for data stored at the secured resource, the access request generated according to the attestation token;
receiving the data from the secured resource; and
sending the data to the compute instance.

9. The method of claim 6, further comprising:
receiving, via the network endpoint, another current configuration for another compute instance;
validating the other current configuration based, at least in part on, a comparison of the other current configuration of the other compute instance with the baseline configuration in the attestation policy;
determining that validating the other current configuration of the other compute instance has failed; and
sending a notification to the other compute instance indicating that the other current configuration does not satisfy the baseline configuration.

10. The method of claim 9, wherein the attestation policy comprises an additional baseline configuration for validating compute instances, wherein the additional baseline configuration is different from the baseline configuration, wherein the method further comprises:
determining that one or more limitations are to be applied to the other compute instance based at least in part on a comparison of the other current configuration and the additional baseline configuration; and
causing that the one or more limitations to be applied to the other compute instance.

11. The method of claim 6, wherein the baseline configuration indicates one or more configuration parameters that limits ingress or egress network traffic to or from the compute instance, configures the compute instance to reject a data transaction at the compute instance, or configures the compute instance to deny a data transfer to or from the compute instance.

12. The method of claim 6, wherein the baseline configuration indicates one or more configuration parameters that are required, including one or more of a platform of the compute instance, software of the compute instance, firmware of the compute instance, hardware implementing the compute instance, or one or more currently running applications of the compute instance.

13. The method of claim 6, wherein the one or more baseline health measure values includes a maximum value or a minimum value for a health parameter.

14. One or more non-transitory computer-readable storage media storing instructions that, when executed on or across one or more processors, cause the one or more processors to:
- execute a virtual computing service comprising one or more computing devices configured to respectively host compute instances allocated to a client, wherein the virtual computing service implements a management interface configured to receive client configuration of the compute instances that specify a baseline configuration of the compute instances, wherein the baseline configuration includes one or more configuration or health parameters that represent a security criterion for validating a compute instance to access a secured resource; and
- receive, via the management interface, a request to enable attestation for the compute instance according to an attestation policy, wherein the attestation policy indicates to use the baseline configuration to validate the compute instance;
- provide a network endpoint for the compute instance to request attestation in response to the request;
- validate a current configuration and health status of the compute instance received via the network endpoint based, at least in part on, a comparison of one or more current health measurement values of the compute instance with one or more baseline health measurement values indicated in the baseline configuration in the attestation policy, wherein the one or more current health measurement values are obtained repeatedly during a run time for the compute instance and monitored based on a trusted platform module for the compute instance; and
- generate an attestation token indicating that a compute instance is validated to access the secured resource upon providing the attestation token to the secured resource.

15. The one or more non-transitory computer-readable storage media of claim 14, further comprising instructions that, when executed on or across the one or more processors, cause the one or more processors to:
- send the attestation token to the compute instance.

16. The one or more non-transitory computer-readable storage media of claim 14, further comprising instructions that, when executed on or across the one or more processors, cause the one or more processors to:
- send an access request to the secured resource for data stored at the secured resource, the access request generated according to the attestation token;
- receive the data from the secured resource; and
- send the data to the compute instance.

17. The one or more non-transitory computer-readable storage media of claim 14, further comprising instructions that, when executed on or across the one or more processors, cause the one or more processors to:
- receive, via the network endpoint, another current configuration for another compute instance;
- validate the other current configuration based, at least in part on, a comparison of the other current configuration of the other compute instance with the baseline configuration in the attestation policy;
- determine that validating the other current configuration of the other compute instance has failed; and
- send a notification to the other compute instance indicating that the other current configuration does not satisfy the baseline configuration.

18. The one or more non-transitory computer-readable storage media of claim 17, wherein the attestation policy comprises an additional baseline configuration for validating compute instances, wherein the additional baseline configuration is different from the baseline configuration, wherein the one or more computer-readable media further comprises instructions that, when executed on or across the one or more processors, cause the one or more processors to:
- determine that one or more limitations are to be applied to the other compute instance based at least in part on a comparison of the other current configuration and the additional baseline configuration; and
- cause the one or more limitations to be applied to the other compute instance.

19. The one or more non-transitory computer-readable storage media of claim 18, wherein the baseline configuration indicates one or more configuration parameters that configure the other compute instance to reject a data transaction at the compute instance.

20. The one or more non-transitory computer-readable storage media of claim 14, wherein the one or more baseline health measure values includes a maximum value or a minimum value for a health parameter.

\* \* \* \* \*